Inventor:
Jacob M. Goldberg
By
Martin E. Anderson
Attorney

Feb. 11, 1941. J. M. GOLDBERG 2,231,384
FILM REWINDING MACHINE
Filed Feb. 27, 1940 7 Sheets-Sheet 3

Inventor:
Jacob M. Goldberg
By Martin E. Anderson
Attorney

FIG. 4

Feb. 11, 1941.   J. M. GOLDBERG   2,231,384
FILM REWINDING MACHINE
Filed Feb. 27, 1940   7 Sheets-Sheet 5

Inventor
Jacob M. Goldberg
By Martin E. Anderson
Attorney

Feb. 11, 1941.          J. M. GOLDBERG                2,231,384
                    FILM REWINDING MACHINE
            Filed Feb. 27, 1940         7 Sheets-Sheet 6

Inventor:
Jacob M. Goldberg
By Martin E. Anderson
Attorney

Inventor:
Jacob M. Goldberg
By Martin E. Anderson
Attorney

Patented Feb. 11, 1941

2,231,384

UNITED STATES PATENT OFFICE 2,231,384

FILM REWINDING MACHINE

Jacob M. Goldberg, Denver, Colo.

Application February 27, 1940, Serial No. 320,993

13 Claims. (Cl. 242—55)

This invention relates to improvements in film rewind machines of the type described and claimed in Patent 2,182,944, granted on December 12, 1939.

In the manufacture and use of moving picture films it is necessary to wind the film onto reels and to transfer them from one reel to another. This rewinding and transferring takes place both at the studio where the films are prepared, and where they are inspected and exhibited.

After each exhibition of a film, it must be rewound in order to bring the front end to the outside of the reel and during the rewinding operation, the film must be inspected for breaks or tears and repaired whenever necessary.

In the patent above identified, a machine has been shown and described that has been designed with particular reference to the needs of a machine for this particular service.

The present invention relates to a new and improved machine of the type above indicated and has for its object the production of a machine that will be reliable in its operation and which can be readily controlled and operated.

Another object of this invention is to produce a machine in which the rewind and the supply reel are each rotated by a separate motor to which they may be connected by means of a variable speed friction drive mechanism by means of which the speed can be easily and accurately controlled.

A further object of this invention is to produce a machine of this type in which the supply and the rewind reels are interconnected in such a way that whenever the power is applied to either one, it will be automatically disconnected from the other power mechanism.

A further object of this invention is to produce a machine having a reel housing of such construction that when the cover is opened, the periphery of the reel is exposed, whereby films may be applied and handled without interference from the surrounding housing wall.

Another object of this invention is to produce a machine in which the reel housings with their movable covers are connected with the friction drive mechanisms in such a way that whenever the door to the housing is opened, the reel is automatically disconnected from the driving mechanism.

Another object of this invention is to produce a power transmitting mechanism of the friction type in which the drive can be disconnected by a slight reverse movement of the control mechanism and in which the power transmitting mechanism is again made operative at the same gear ratio by a corresponding slight movement in the opposite direction.

The above and other objects of this invention which may become apparent as this description proceeds are attained by means of a construction and an arrangement of parts that will now be described in detail, and for this purpose reference will be had to the accompanying drawings, in which the preferred construction of the machine has been illustrated, and in which:

In the drawings reference numeral 12 designates the base of the machine and reference numeral 13 the top thereof. In each corner of the machine is positioned a post 14 which has been shown in section in Figure 2. These posts are curved so as to present sides positioned at ninety degrees towards each other and along each vertical edge is a rabbet 15. In addition to the corner posts 14, each end section of the machine is provided with supporting posts 16 that are of substantially the same construction as posts 14, but which, in the embodiment illustrated, have sharper corners than the corner posts. The posts 16, like posts 14, are provided with rabbets 15. In the finished machine side and end plates 17 and 18 respectively are positioned with their vertical edges in the rabbets 15 so as to form closures for the compartment containing the mechanism.

Figures 6, 7, 8, 9:
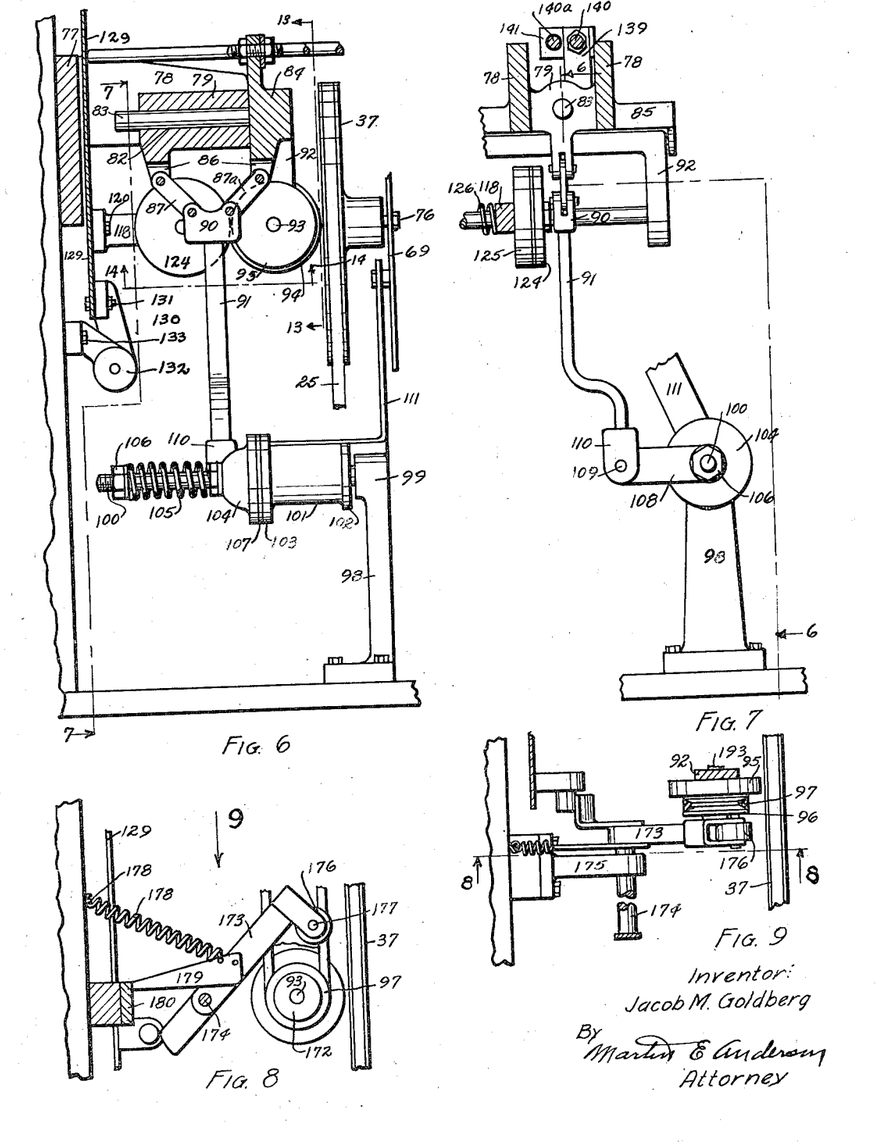
Figure 6 is a view partly in elevation and partly in section taken along planes 6—6, Figures 2 and 7.
Figure 7 is an elevation taken on line 7—7, Figure 6.
Figure 8 is a view partly in section and partly in elevation taken on line 8—8, Figure 9, and shows a reverse drive mechanism for the supply reel.
Figure 9 is a top plan view looking in the direction of arrow 9, in Figure 8.

In the drawings the mechanism positioned in the compartment designated by A only has been shown because the driving mechanism positioned in compartment B at the other end of the machine is a substantial duplicate of the one illustrated with this exception that the parts are reversely arranged and that a reversing mechanism like that shown in Figures 8 and 9 is provided in connection with the transmission mechanism located in compartment B.

Figure 4:
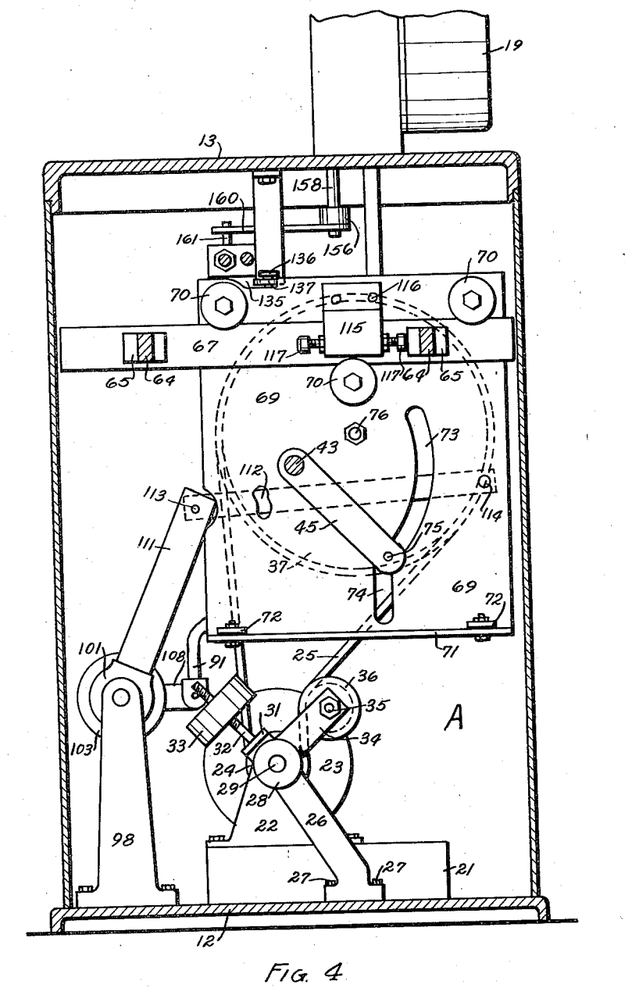
Figure 4 is a section taken on line 4—4, Figure 3.
Figure 5:
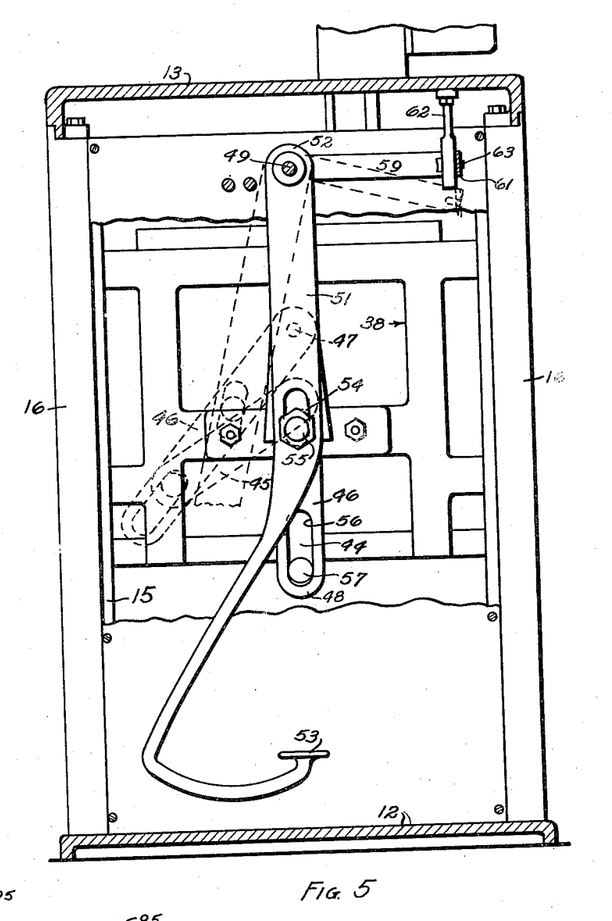
Figure 5 is a section taken on line 5—5, Figure 1, parts being broken away to disclose the construction and the operative position of the parts indicated by dotted lines.

Supported on the top of the machine are two reel housings, one of which has been designated by reference numeral 19 and which will be referred to as the rewind reel housing. The other has been designated by reference numeral 20 and will be referred to as the supply reel housing. The construction of these reel housings and their relationship to the other parts of the mechanism will be hereinafter described in detail. Supported on the base 12 by means of blocks 21 and U-shaped supporting bracket 22, is a motor 23. The drive shaft of the motor is provided with a V-groove pulley 24 for the reception of a V-type driving belt 25. A bracket 26 is attached to the base by means of bolts 27 and is provided at its upper end with a hub 28 in which is positioned a stub shaft 29. A hub 30 is rotatably mounted on the stub shaft and is provided with a lateral extension arm 31 from which a threaded rod 32 extends. A weight 33 is threadedly connected with the rod 32 so as to be adjustable along the latter. An arm 34 has its inner end attached to the hub 30 and is provided near its outer end with a bolt or shaft 35 on which an idler pulley 36 is rotatably mounted. As seen in Figures 3 and 4, the idler 36 engages the outer surface of belt 25 and the weight 33 is so selected and positioned as to impart to the belt 25 the necessary tension and at the same time permit the distance between the center of pulley 24 and the center of the large pulley 37 to be altered. Secured to or formed integral with post 16 is a frame which has been indicated in its entirety in Figure 5 by reference numeral 38. Extending from the frame 38 and positioned in compartment C is a bracket 39 that is provided with an upwardly extending portion 40 which terminates in a hub 41. A similar arm 39a extends inwardly from frame 38 and has an upwardly extending portion 42. A shaft 43 is mounted for rotation in bearings in the upwardly extending arms 40 and 42. To the end of shaft 43 which is positioned in compartment C, is attached a crank arm 44 and to the inner end of this shaft another crank arm 45 is attached. A lever 46 is pivotally attached at its upper end to hub 41 by means of a bolt 47. This lever extends downwardly and terminates at point 48. A shaft 49 is supported at its ends in openings provided therefor in the upwardly projecting portions 50 on frames 38. Supported by the shaft 49 and mounted for pivotal movement thereon are two pedal arms 51, whose upper ends are provided with hubs 52 and whose lower ends are provided with pedals 53. The pedal arms are provided with longitudinal slots 54 for the reception of a bolt or pin 55 whose inner end is rigidly attached to lever 46. The lower end of lever 46 has an elongated slot 56 for the reception of a bolt 57 that is carried by the lower end of crank arm 44. Collars 58 are secured to the shaft 49 at each side of hubs 52 and serve to hold the hubs in position. Extending forwardly from each hub 52 is a lever arm 59. These lever arms are provided with openings for the reception of pins 60 carried by the ends of a rocker arm 61 that is pivotally attached to a downwardly extending bracket 62 by means of a bolt 63. Since the arms 59 are nonrotatably connected with the hubs 52 and since they are interconnected by the rocker arm 61, it is evident that when one of the pedals 53 is moved towards the left, when viewed as in Figure 5, the corresponding pedal at the other end of compartment C will move towards the right; or, in other words, when one of the pedals is moved towards the top of Figure 2, the other pedal will move towards the bottom and in this way the two pedals are interconnected for simultaneous and equal movements in opposite directions. In connection with the description here given, it must be borne in mind that the mechanism illustrated and shown as positioned in compartment A has a corresponding mechanism positioned in compartment B. These mechanisms as has been previously indicated, are substantially identical.

From the description above given it is apparent that when force is exerted on either one of the pedals 53 to rock the same about shaft 49, a rotary movement will be transmitted to shaft 43 and due to the fact that pedals 51 are connected with lever 46 at a point substantially midway between bolt 47 and bolt 57, the lower end of lever 46 will move faster than the pin 55 and for this reason a given angular movement of pedal arms 51 will impart a considerably greater angular movement to shaft 43. Since the lever arms are interconnected by the rocker arm 61, it is evident that the shaft 43 at opposite ends of compartment C will rotate in opposite direction. Frame 38 is provided with vertical and inwardly extending flanges 64 which terminate in enlarged ends 65 and 66. A flat steel bar 67 is attached to the enlarged ends 65 and a similar steel bar 68 is attached to the enlarged ends 66. The bar 67 is wider than the enlarged ends 65 and projects both above and below the supports in the manner indicated in Figure 3.

A plate 69 is provided near its upper edge with two grooved rollers 70 that engage the upper edge of the flat bar 67 and serve to guide the plate while it moves longitudinally on this bar. A similar roller is positioned below bar 67. The lower edge of plate 69 is bent at right angles so as to provide a flange 71 that extends towards the bar 68 in the manner shown in Figure 3 and rotatably attached to this flange are two rollers 72 that engage the outer surface of bar 68 and serve to guide the same.

From the above description it will be apparent that plate 69 can move in the direction of bars 67 and 68 and for the purpose of imparting to this plate such a movement it has been provided with a curved slot 73 that terminates in a straight downwardly extending portion 74. The free end of crank arm 45 is provided at its lower end with a bolt 75 that extends through the slot 73.

Referring now more particularly to Figure 4, it will be seen that whenever shaft 43 is rotated, it will carry with it the crank arm 45 and move bolt 75 along the slot 73. That portion of the slot designated by numeral 73 is curved about the center of shaft 43 and therefore whenever crank arm 45 moves in such a way that bolt 75 travels in slot 73, plate 69 will not move transversely, but will remain stationary. If crank arm 45 is rotated clockwise from the position shown in Figure 4, bolt 75 will enter the downwardly extending straight portion of the slot which has been designated by reference numeral 74 as soon as it enters this part of the slot, it will impart a transverse movement to plate 69. The parts are so arranged that when bolt 75 engages slot portion 74 in compartment A, the corresponding bolt in compartment B will move in the opposite direction and vice versa; by means of this construction the plate 69 in one end of the machine will remain stationary whenever the corresponding plate in the other end of the machine is moved transversely.

Carried by plate 69 is a grooved pulley 37 that is mounted for rotation about a pivot 76 which is carried by plate 69. Since belt 25 interconnects pulley 37 with the corresponding driving pulley 24, it is evident that the distance between the center of pulley 24 and the center of pulley 37 will vary with the transverse position of plate 69 and it is for the purpose of permitting such variation and still maintaining the driving belt under a substantially constant tension, that idling pulley 36 with its gravity actuated operating means has been provided.

The reason plate 69 is moved in the manner above explained is to change the speed ratio which is effected by means which will now be described.

Figure 2:
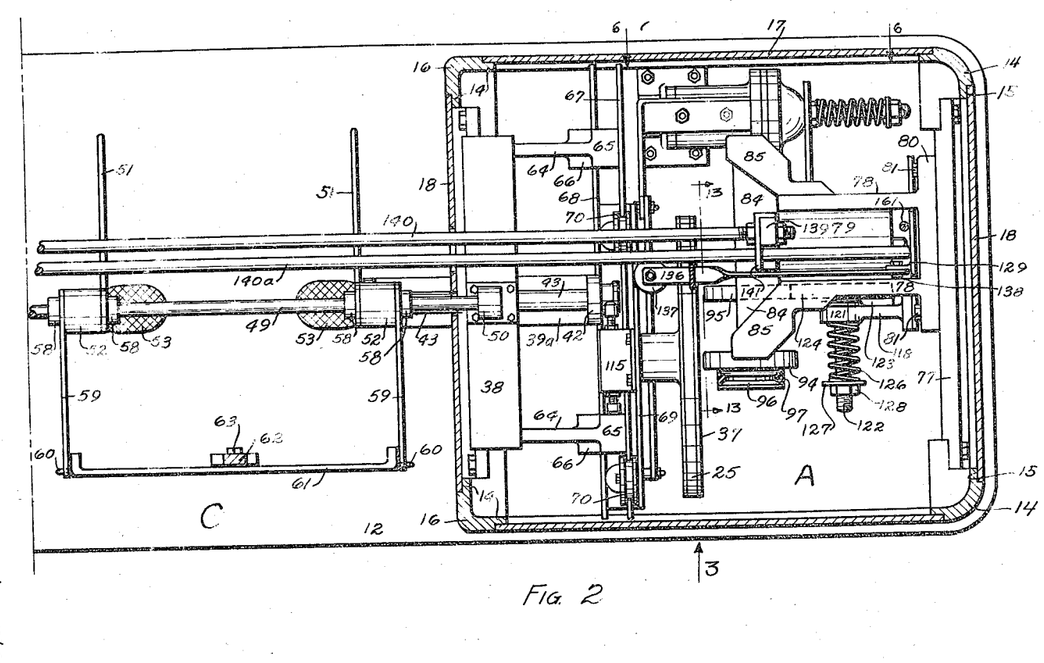
Figure 2 is a section taken on line 2—2, Figure 1, and shows a top plan view of the power transmission and control mechanism positioned at the righthand end of the machine.
Figures 3, 13:
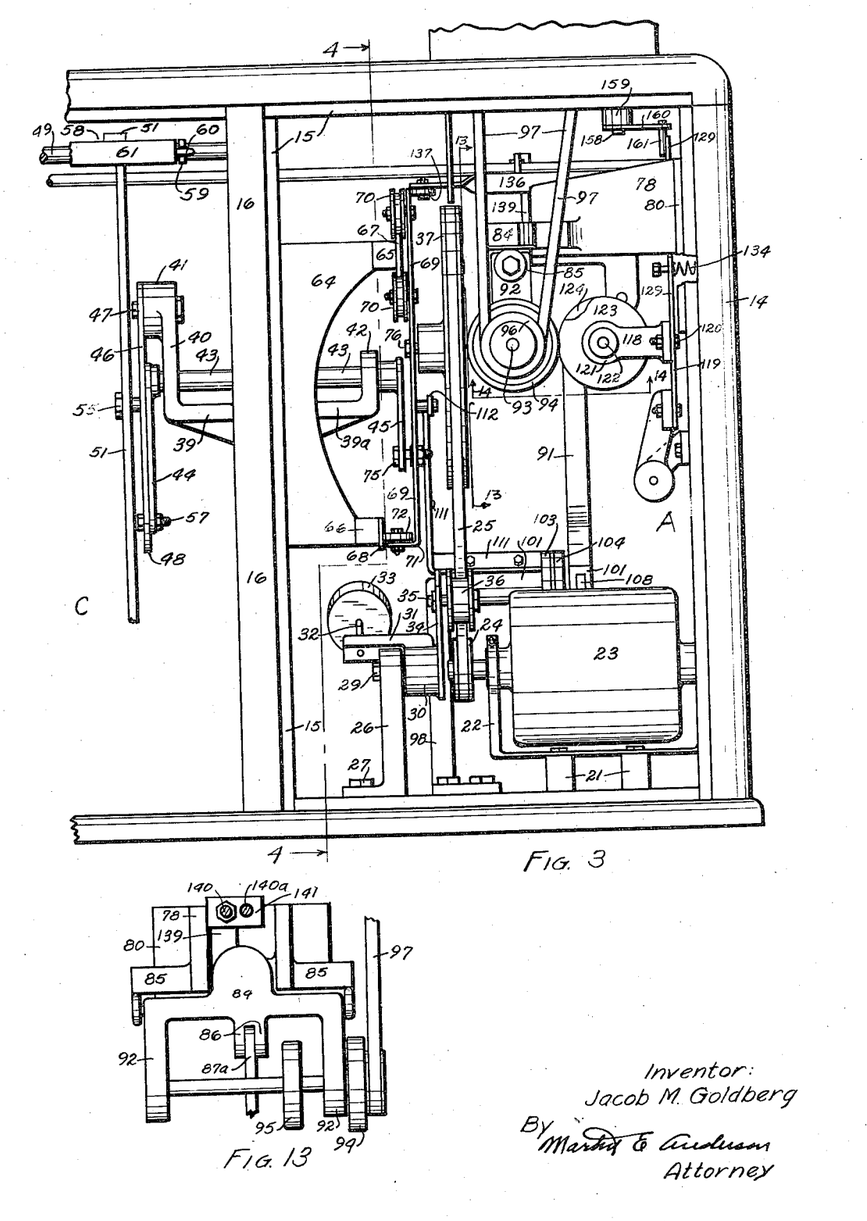
Figure 3 is an elevation looking in the direction of arrow 3 in Figure 2.
Figure 13 is a view, taken on line 13—13, Figures 2, 3 and 6.

Referring now more particularly to Figures 2, 3 and 6, it will be seen that a transverse bar 77 is attached to the corner posts 14 at the righthand end of the machine and projecting inwardly from this bar is a frame comprising two parallel arms 78 that are connected by an integral portion 79. These arms are provided with outwardly turned feet 80 which fit against the bar 77 and which are attached thereto by means of bolts 81. The connecting portion 79 is provided with an opening 82 in which is slidably mounted a pin 83 that projects rearwardly from a casting 84. The arms 78 are provided with outwardly extending members 85 whose under surfaces serve as guides for the ends of the casting 84 and which prevent the latter from turning about the axis of pin 83. The part 79 is provided with spaced downwardly extending lugs 86 between which is positioned one end of the link 87 and to which this link is pivotally attached by means of a pin 89. The casting 84 is similarly provided with corresponding lugs 86 to which the link 87a is attached. The lower ends of links 87 and 87a are pivotally attached to a head 90 carried by the upper end of bar 91. Links 87 and 87a, together with head 90, form a toggle and when head 90 is moved upwardly, casting 84 will be moved towards the right because the lugs 86 attached to member 79 are stationary. Extending downwardly from the casting 84 are integral lugs 92 that are provided with bearings for the reception of shaft 93. Attached to shaft 93 are two friction pinions which have been designated respectively by numerals 94 and 95. Attached to one side of the friction pinion 94 is a grooved pulley 96 with which is operatively connected an endless V-type belt 97. When plate 69 is in the position shown in Figure 4, the friction pinion 94 is so positioned that its median plane corresponds to the axis of the pulley 37. Friction pinion 94 is larger in diameter than pinion 95 so that the latter can never contact the friction surface of pulley 37.

Referring now to Figure 6 it will be seen that when bar 91 is moved upwardly so as to spread the upper ends of links 87 and 87a; casting 84, which carries the two friction pinions 94 and 95, will be moved towards the adjacent surface of pulley 37, whereupon the peripheral surface of pinion 94 will engage the friction surface of pulley 37. If the latter is rotating when this contact is first made, pinon 94 will not rotate because it contacts the friction surface at the center of rotation. In order to obtain rotation of pinion 94 and pulley 96, it is necessary to shift the pulley 37 along its supporting bar 67 so as to move the center of the disk away from the plane of rotation of the friction pinion and this shifting is accomplished by the means shown in Figure 4, which has heretofore been described.

At this point attention will be directed to Figures 4, 6 and 7 from which it will be seen that a bracket 98 is attached to the base 12 and extends upwardly where it terminates in an enlarged end 99 to which one end of a bolt 100 is nonrotatably connected. Rotatably mounted on bolt 100 is a cylindrical member 101, whose inner end engages an abutment plate 102 that is carried by the bolt. The other end of the cylindrical member 101 has an outwardly extending flange 103 that serves as a friction surface. A cooperating friction clutch member 104 is rotatably mounted on bolt 100 and is urged against the flange 103 by a helical compression spring 105. The tension in this spring can be adjusted by means of a nut 106. A leather washer or other similar material 107 separates the friction clutch member 104 from the friction surface of flange 103. A crank arm 108 is rigidly attached to the friction clutch member 104 and whenever the latter rotates about the bolt 100, crank arm 108 will move downwardly or upwardly. Pivotally attached to the free end of the crank arm 108 by means of a pivot pin 109, is the head 110 which forms the lower end of bar 91. It is now evident that if friction member 104 is rotated in a clockwise direction when viewed as in Figure 7, it will move bar 91 upwardly, whereupon the toggle will operate and force friction pinion 94 against the surface of pulley 37.

The friction clutch which has just been described is operated by the following means:

From Figure 4, is will be seen that a crank arm 111 is attached to the cylindrical member 101 and extends upwardly in the manner shown. A connecting rod 112, which has been shown dotted in Figure 4, is pivotally attached to the upper end of crank arm 111 by means of a pin 113 and the other end of this connecting rod is attached to plate 69 by means of a pin 114 and therefore whenever plate 69 moves to the left when viewed as in Figure 4, it will impart to crank arm 111 a counter clockwise movement, which movement will be transmitted to clutch member 101 and from thence to clutch member 104. The first few degrees of rotation of member 101 will suffice to operate the toggle and move friction pinion 94 into engagement with pulley 37.

Further rotation of member 101 can take place because this member will move relative to clutch member 104, due to the friction connection between the two.

Since crank arm 111 can rotate counter clockwise after crank arm 108 has stopped rotating, it is evident that the friction clutch connection will remain operative as long as plate 69 moves towards the left when viewed as in Figure 4 or remains stationary. If plate 69 is moved towards the right, however slightly, crank arm 108 will move downwardly, thereupon releasing the friction engagement between pinion 94 and pulley 37. From this it will be apparent that a slight motion of plate 69 towards the right will disconnect the power transmission means from the rewind reel. If plate 69 is moved towards the right a short distance and then returned, the friction connection will be established almost immediately at the same ratio at which it was when the disconnection took place.

It has already been pointed out that friction pinion 95 is of slightly smaller diameter than friction pinion 94 and therefore the former will never contact with the friction surface of pulley 37. Plate 69 is provided with a Z-shaped plate 115 which has been shown in Figures 2 and 4 and which is secured to plate 69 by means of bolts or rivets 116. This plate has a portion that extends down below the upper edge of bar 67 and attached to plate 115 are two adjusting screws 117. These screws serve as stops and engage the inner ends of enlarged portions 65. These screws are so adjusted that when plate 69 is in the position shown in Figure 4, which will be referred to as normally inoperative position, the adjusting screws 117 will stop the plate and the pulley 37 in such a position that a vertical plane passing through the center of pivot 76 will intersect pinion 94 at its center. It is therefore evident that if pinion 94 is moved into contact with the rotating friction of pulley 37, there will be no rotation of the pinion because it contacts the rotating friction surface at the center. It has previously been explained that slot 73 is curved about the center of pin 43 for a portion of its length and so long as the bolt or pin 75 moves in this curved slot, plate 69 will remain stationary, but as soon as crank arm 45 is moved clockwise, when viewed in Figure 4, to any extent below the position shown in that figure, it will function to move plate 69 towards the left and will continue to move it in that direction in response to pressure on pedal 53 until the other adjusting screws 117 engage the enlarged portion 65 to the left in Figure 4. It will be remembered that there is a corresponding mechanism in compartment B which moves in the opposite direction due to the interconnection of the pedals by means of bar 61. As soon as plate 69 begins to move towards the left, when viewed as in Figure 4, the connecting rod 112 will rotate crank arm 111 counterclockwise and this in turn will move the bar 91 upwardly so as to operate the toggle illustrated in Figure 6. The toggle functions to move member 84 to which pinions 94 and 95 are attached, towards the right when viewed as in Figure 6 and this forces the pinion 94 against the friction surface of pulley 37. Since the toggle will be operated by a very slight movement of plate 69, it is evident that the friction drive is made operative so quickly that pinion 94 will be only a short distance from the center and it will therefore rotate very slowly. Any further movement of plate 69 will increase the distance from the center of pulley 37 to the pinion, thereby increasing the speed ratio. If, for any reason, the reel is to be stopped, the pressure on pedal 53, shown to the right in Figure 2, is released, and the pressure on the other pedal increased, whereupon shaft 43 will move in a counterclockwise direction. A very slight movement of plate 69 towards the right releases the friction drive connection because bar 91 moves downwardly and withdraws pinion 94. The movement of plate 69 to effect such a disconnection is very small and therefore by again moving the pedal 53, so as to rotate shaft 43 in a clockwise direction, the friction drive will be established almost immediately and at substantially the same position where it was when the connection was broken.

The belt 97 transmits power from pulley 96 to the rewind reel positioned in housing 19 and it is desirable to apply a retarding force to slow up the rotation of shaft 93 whenever the friction drive is disconnected and the mechanism provided for this purpose will now be described.

A bracket 118 is secured to a plate 129 by means of bolts 120 and the outer end of this bracket forms a bearing 121 for the reception of a tension bolt 122. A friction disk 123 is positioned with one side against the bracket 118 and held against rotation relative to said bracket by some suitable means, such as a pin. Another friction disk 124 has an opening for the reception of the bolt 122 and is separated from disk 123 by means of a spacer 125 of leather or fiber. A helical spring 126 surrounds the bolt with one end in engagement with the outer surface of bracket 118 and the other abutting the washer 127. A nut 128 maintains the spring under compression. Since disk 123 is held against rotation and since disk 124 is rotatable, it is evident that in order to rotate the latter disk, a considerable force is required because it must overcome the frictional resistance between the two disks. This frictional resistance can be adjusted by means of spring 126 and nut 128. Disk 123 is positioned so as to engage the periphery of pinion 95 when the two are moved towards each other and therefore, in order that pinions 94 and 95 may rotate they must overcome the resistance of the friction retarder comprising members 123, 124 and 125.

Referring now more particularly to Figure 6, it will be observed that the bracket 118 is attached to a plate 129 and that the latter is secured to a hinge member 130 by means of bolts or other suitable means 131. Hinge member 130 is pivotally connected with another cooperating hinge member 132 and the latter is secured to the frame by means of bolts 133. A spring 134, most clearly shown in Figure 3, urges the plate towards the left when viewed as in Figure 3, and there is, therefore, always a tendency for friction disk 124 to move into engagement with pinion 94.

Referring now to Figure 4, it will be observed that the upper edge of plate 69 has a notch 135 near the left edge thereof. A flat bar 136 has one end provided with a roller 137 which normally engages one side of plate 69. When plate 69 is in normal or inoperative position, the roller 137 is positioned in the notch as shown in Figure 4, but upon plate 69 being moved a short distance towards the left, the roller will be raised out of the notch into the position indicated in Figure 3. The end of the rod 136 to the right, when viewed in Figure 2, is pivotally connected with plate 129 by means of a bolt 138 and therefore whenever the roller 137 is moved towards the right when passing from the notch it moves the plate 129 towards the right and thereby separates the roller 124 from pinion 94 and this removes the retarding mechanism, thereby permitting the reel in housing 19 to rotate freely.

As has already been explained, a movement of plate 69 towards the left from the position shown in Figure 4 operates the toggle mechanism and urges friction pinion 94 into engagement with the friction surface of pulley 37.

It will be seen from Figure 2 that member 84 has an upwardly extending portion 139 that is provided with an opening for the reception of one end of a rod 140. Suitable clamping nuts hold the rod against longitudinal movement with respect to the projection 139. An L-shaped bracket 141 is clamped between projection 139 and one of the clamping nuts and is perforated for the reception of a rod 140a which is identical with rod 140 and which has one end clamped to an upward projection 139 located within compartment B. Rod 140a is freely movable in the bracket 141 and terminates adjacent plate 129 and therefore whenever it is moved towards the right, when viewed as in Figure 2, it moves plate 129 towards the right, thereby releasing the retarding device in the same manner as when bar 136 is moved towards the right. Whenever the toggle operates to move pinions 94 and 95 towards the left, when viewed as in Figure 2, rod 140 is moved in a corresponding manner, thereby removing the friction retarding device from the reel positioned in housing 20. In the same manner if the friction drive mechanism in compartment B is made operative, rod 140 moves the friction retarding device in compartment A to inoperative position.

Figure 1:
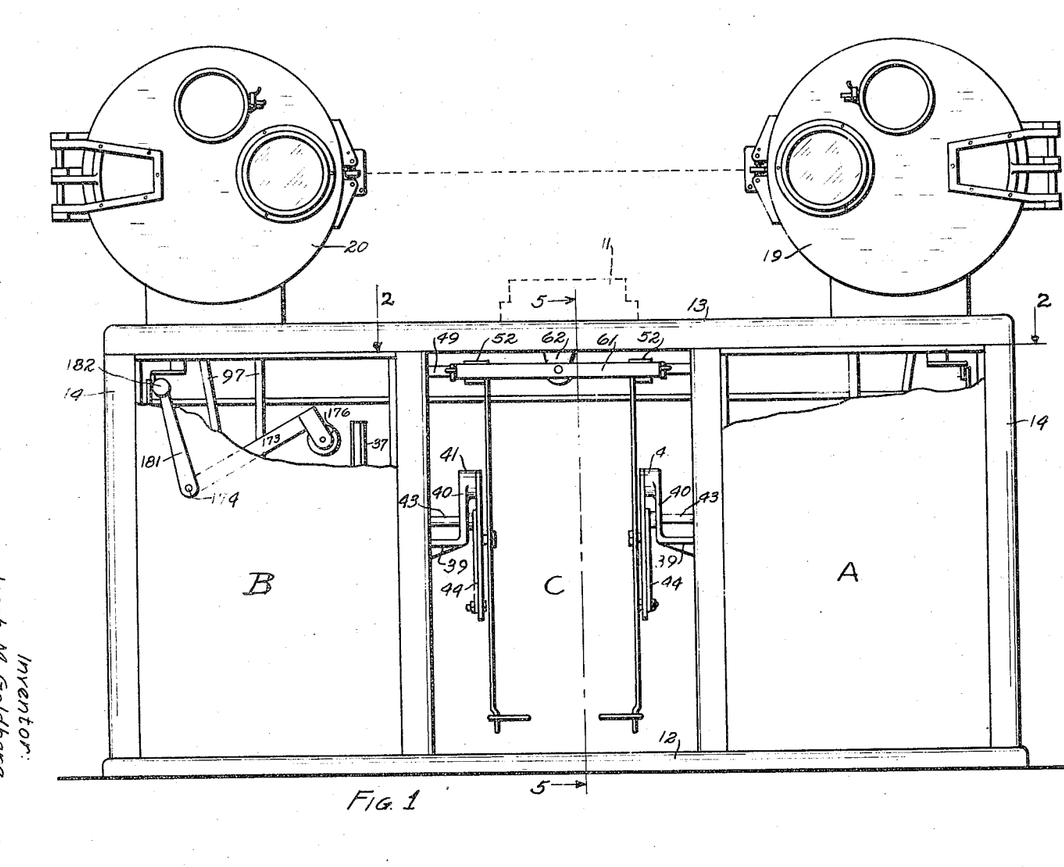
Figure 1 is a front elevation of the machine, parts being broken away to better disclose the construction and the relationship of the parts.
Figure 10:
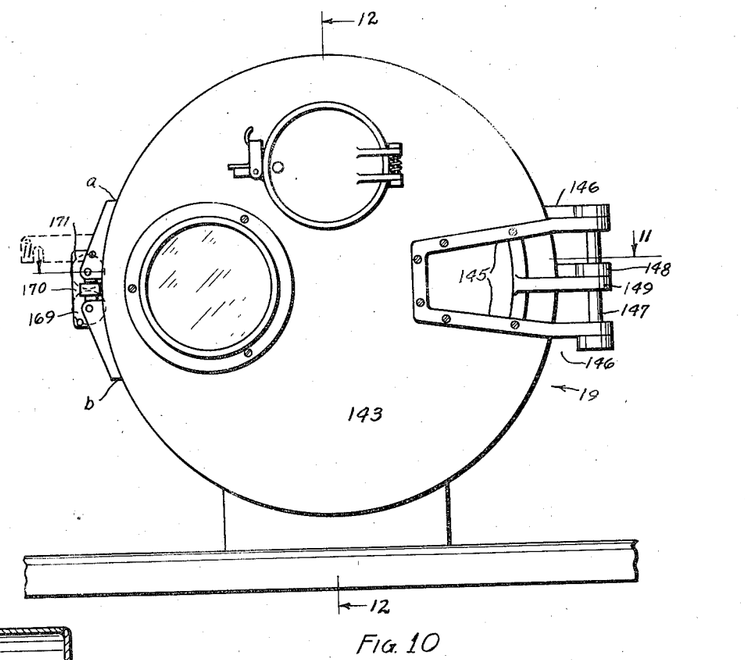
Figure 10 is a front elevation of the rewind reel housing.
Figure 11:
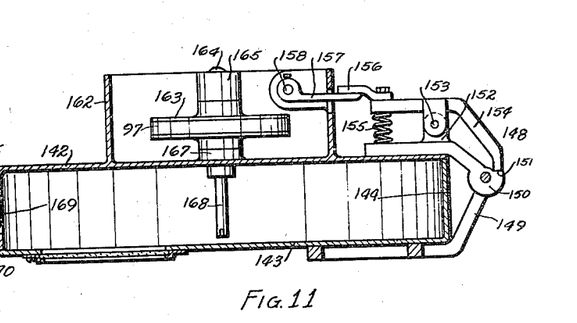
Figure 11 is a section taken on line 11—11, Figure 10.
Figure 12:
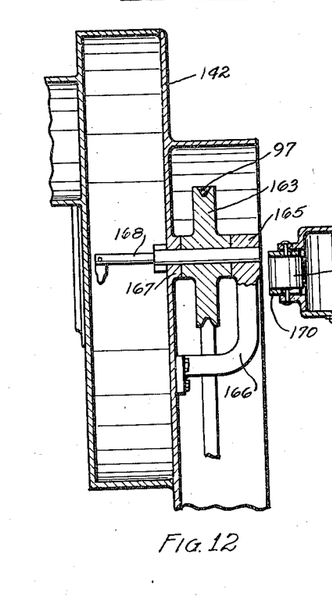
Figure 12 is a section taken on line 12—12, Figure 10.
Figure 14:
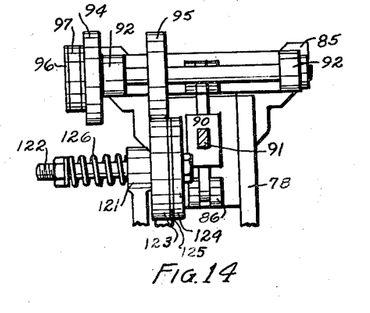
Figure 14 is a view taken on line 14—14, Figures 3 and 6.

Referring now more particularly to Figures 10, 11 and 12, in which reference numeral 19 designates, in its entirety, the rewind reel housing, it will be seen that this housing is circular and consists of a vertical partition 142, to which is hingedly connected a cover 143. The cover is provided with a cylindrical flange 144 that extends around the same from point a to point b in Figure 10. The hinge consists of a substantially U-shaped portion designated by reference numeral 145 in Figure 10. A cooperating hinge member comprises two parts 146 that are attached to the rear of the partition 142. A pin 147 forms the pivot of the hinge. The two hinge members are provided with intermediate hinge portions which have been designated by reference numerals 148 and 149. Member 149 terminates in an enlarged end 150 which is provided with a cam surface terminating in a radial shoulder 151. Hinge member 148 has an outwardly extending lug 152 that projects between the spaced arms 153 of a pawl 154. A spring 155 is positioned between the end of the pawl and toggle member 148 and tends to turn the pawl clockwise about its pivot. When the door is opened from the position shown in Figure 11, the pawl will be rotated counterclockwise until it rests on the curved surface of the cam and in so doing the part marked 156 will move towards the partition and rotate the arm 157 in a clockwise direction about the axis of rod 158. A reference to Figure 4 will show that rod 158 extends down beneath the tabletop and through a bearing lug 159. A crank arm 160 is attached to the lower end of rod 158, and projecting downwardly from the free end of this crank arm is a pin 161 that engages the upper end of plate 129 in the manner shown quite clearly in Figure 3. When the door of the rewind reel housing is opened, plate 129, together with the retarding roller 124, will be moved to inoperative position, whereupon the reel located in this housing can be freely rotated. When the door is again closed, arm 157 will return to its original position, as shown in Figure 11, thereupon reestablishing contact between roller 124 and pinion 95. The pawl 154 serves, in addition to the purpose above described, to hold the door of the reel housing in closed position during operation. Extending rearwardly from partition 142, are walls 162 which form a housing in which is located a pulley 163 with which the belt 97 cooperates. The pulley is attached to a shaft 164 that is journaled in a bearing 165 positioned at the upper end of a bracket 166. Shaft 164 is also journaled in a bearing 167 and has an end 168 of reduced diameter extending into the reel housing and which serves to support a moving picture reel. The housing is provided at the left, when viewed as in Figure 10 with an opening through which the film may enter and leave and which is positioned between two rollers 169. A plate 170 is mounted for movement about the pivot 171 and can be swung outwardly into dotted line position whenever the film is to be inserted or removed. The housing for the supply reel which has been indicated by reference numeral 20, in Figure 1, is constructed in the same manner, but reversed in such a way that the two housings form rights and lefts that cooperate during the winding and unwinding of the film.

It has been repeatedly pointed out that the mechanism in compartments A and B are substantially identical, but are reversely arranged so that the pulley 37 is nearest the center in both compartments. There is, however, one difference which will now be explained.

During the operation of rewinding and inspecting a film the supply reel is always placed in housing 20 and the rewind reel in housing 19. During the rewinding operation, the film passes at a high speed from one reel to the other and the operator permits it to run between his or her fingers for the purpose of detecting any tears or breaks. If a faulty place is detected, the rewinding reel is stopped as soon as possible, but cannot be instantaneously stopped with the result that the defective portion may have entered the rewind housing before the film comes to a dead stop. It is now necessary to run the film in a reverse direction so as to return the defective portion to the center of the table where a splicing device is positioned. In order to accomplish this reverse movement, a slight addition has been made to the mechanism located in compartment B and this addition has been shown in Figures 8 and 9. Attached to shaft 93 and positioned adjacent the pulley 97, is a cylindrical projection, a lever 173 is secured to a shaft 174 that is journaled in a bearing in bracket 175. A roller 176 is carried by the end of lever 173 and mounted for rotation about a pivot pin 177. A spring 178 has one end attached to the lever and the other secured to the end wall of the machine at a point designated by reference numeral 178. A stop 179 is electrowelded to the lever 173 and is positioned to engage the plate 180 to limit the upward movement of the lever. A handle 181 is connected to the outer end of shaft 174 as shown in Figure 1 and the operator by grasping the handle portion 182, can turn shaft 174 clockwise, thereupon bringing roller 176 into position between the periphery of the cylindrical portion 172 and the adjacent surface of pulley 37. It is evident that by interposing the roller 176, shaft 93 will be rotated in a direction opposite to that in which it would be rotated if pinion 94 were moved into contact with the friction surface.

Attention is called to the interrelation and the cooperation between the parts in compartments A and B whereupon a simultaneous action or movement of the parts in opposite direction is attained by the operation of the pedals. A splicing mechanism which has been indicated by dotted lines in Figure 1 and which forms the subject of a separate application, is positioned on the table and employed for mending the film.

Having described the invention what is claimed as new is:

1. A reel rewind mechanism comprising in combination, a support, a rewind and a supply reel mounted thereon, a motor carried by the support, a friction disk carried by the support, means comprising the motor for rotating the disk, a shaft extending parallel with the friction surface of the disk, a friction pinion non-rotatably secured to the shaft, means for normally holding the disk and pinion in spaced relation, means for moving the center of the friction disk in a direction parallel with the axis of the shaft, means operated by the last mentioned movement of the disk in one direction for effecting a frictional engagement between the friction surface of the disk and the pinion and for maintaining said driving connection until the friction disk is moved in the opposite direction, and means comprising the shaft and the pinion for transmitting motion from the disk to the rewind reel.

2. A reel rewind mechanism comprising in combination, a support, a rewind and a supply reel mounted thereon, a motor carried by the support, a friction disk carried by the support, means comprising the motor for rotating the disk, a shaft extending parallel with the friction surface of the disk, a friction pinion non-rotatably secured to the shaft, means for normally holding the disk and pinion in spaced relation, means for moving the center of the friction disk in one direction parallel with the axis of the shaft, means operated by the last mentioned movement of the disk for effecting a frictional engagement between the friction surface of the disk and the pinion and for maintaining said driving connection until the friction disk is moved in the opposite direction, said last mentioned means comprising a friction clutch, one part of which is operatively connected with the shaft and the friction pinion, means operatively connected with the friction disk for moving the other member of the friction clutch whenever the center of the friction disk is moved and means for transmitting movement from the friction pinion to the rewind reel.

3. In a film rewind device having a supporting frame, a table supported thereby, a supply reel positioned on the table near one end thereof, and a rewind reel positioned on the other end of the table, means for independently rotating the reels and controlling the speed thereof comprising in combination, an elongated horizontal track, a carrier member mounted for movement therealong, a friction disk attached to the carrier member for rotating in a plane parallel with the track, a bearing member movably carried by the support, a shaft journalled in the bearing, the axis of the shaft being parallel with the track and substantially at the level of the axis of the friction disk, two friction pinions carried by the shaft, one of which is of greater diameter than the other, means comprising a toggle mechanism for moving the bearing member towards and away from the friction disk, means for operating the toggle, comprising a friction clutch having one member connected with the carrier member for movement thereby, whereby the friction drive will become operative when the carrier member is moved in one direction and inoperative when it is moved in the other direction, a retarding member, movably carried by the support, resilient means comprising a spring for urging the retarding device towards the smaller friction pinion, and means operated by movement of said carrier member for moving the retarding device to inoperative position when the carrier member is moved from normal inoperative to operative position.

4. In a film rewind device having, in combination, a support, a table carried thereby, a rewind reel carried by the table, a motor carried by the support and means comprising friction drives for transmitting movement from the motor to the rewind reel, a variable speed friction drive comprising in combination, a track, a carrier member attached thereto and movable therealong, a pedal pivoted to the support, a movable member having a bearing for the reception of a shaft, a friction pinion attached to the shaft, a pulley also carried by the shaft, means comprising a belt for transmitting motion from the pulley to the rewind reel, a friction disk rotatably attached to the carrier member, the plane of rotation of the disk being substantially parallel with the shaft, means comprising the pedal for moving the carrier member and the friction disk along the track, and means operated by the movement of the plate in one direction, for effecting a relative movement between the friction pinion and the friction disk to effect an operative friction connection between them, said means comprising a friction clutch having two relatively movable friction elements one of which is connected with the carrier member for movement thereby and the other of which is operatively connected to the bearing member.

5. In a film rewind device having a support, a table mounted thereon, supply and a rewind reels mounted on the table, and power driven means for selectively rotating the reels, a reel operating mechanism comprising a constantly rotating disk for each reel, said disk having a friction surface, bearing members attached to the support for movement towards and away from the friction surfaces, a shaft rotatably carried by each bearing member, the axes of the shafts being substantially parallel with the friction surfaces, a friction pinion carried by each shaft, the pinion and the adjacent friction surface being normally out of engagement, means comprising pedals operatively connected with the friction disks for imparting to them a lineal movement in the direction of the axes of the shafts, means comprising a friction clutch and a toggle device associated with each bearing member for moving it towards the corresponding friction surface whenever the friction disk is moved in a direction to increase the distance from its center of rotation to the plane of the friction pinion, the friction disks being each operatively connected with one member of the corresponding friction clutch and the toggle device connected with another member thereof, a rotation retarding device associated with each shaft and means for selectively applying the rotation retarding devices to the shafts, said means comprising friction members movable to and from operative position, resilient means for urging them into operative position, means operated by the movement of the friction disks from normally inoperative position for moving the retarding devices to inoperative position, and means operated by the movement of either retarding device to operative position for moving the other retarding device to inoperative position.

6. In a film rewind device having a support, a table mounted thereon, a supply and a rewind reel mounted on the table and power driven means for selectively rotating the reels, reel operating mechanism comprising a constantly rotating pulley for each reel, a friction surfaced disk operatively associated with each pulley, bearing members attached to the support for movement towards and away from the friction surfaces, a shaft rotatably carried by each bearing member, the axes of the shafts being substantially parallel with the corresponding friction surfaces, a friction pinion carried by each shaft, the pinion and the adjacent friction surface being normally out of engagement, means comprising a pedal operatively connected with each friction disk for imparting to it a movement in a direction parallel to the axis of the adjacent shaft, means comprising a friction clutch and a toggle device for moving each bearing member towards the corresponding friction surface of a friction disk whenever the friction disk is moved in a direction to increase the distance from its center of rotation to the plane of the friction pinion, the friction disks being each operatively connected with one member of the corresponding friction clutch and the toggle device connected with another member thereof, means for selectively applying a rotation retarding force to the shafts, said means comprising friction members movable to and from operative position, resilient means for urging them into operative position, means operated by the movement of the friction disks from normally inoperative position for moving the retarding devices to inoperative positions, and rods attached at one of their ends to the bearing members, their other ends terminating adjacent the rotation retarding means that are associated with the other shafts for changing the position of the latter whereby whenever the friction drive connected with a reel is made operative, the retarding device will be removed from operative engagement with the other reel.

7. In a film rewind mechanism, having, in combination, a support, a table carried thereby, a supply and a rewind reel attached to the table and motors carried by the support, means for independently rotating either of the reels by power derived from the motors, said means comprising tracks carried by the support, a carrier plate supported on each track for movement therealong, two pedals pivotally attached to the support, two shafts carried by the support for limited oscillating movement, means for oscillating the shafts by a pivotal movement of the pedals, the shafts each terminating adjacent a carrier plate, a crank arm carried by the last named ends of the shafts, stop means for limiting the movement of the carrier plates along the tracks, each carrier plate having an arcuate slot concentric with the shaft when the plate is in one of its limited positions, one end of the slot terminating in a short substantially straight portion that extends at right angles to the track, the crank arm having a pin that projects into the slot, the arcuate portion of the slot forming a lost motion connection which permits the plate to remain stationary while the pin moves in said arcuate portion, the straight portion of the slot forming a positive drive connection between the crank arm and the plate, means interconnecting the pedals to constrain them to move in opposite directions whereby one carrier plate will remain stationary while the other moves along its track, a pulley rotatably carried by each plate, means for transmitting movement from the motors to the pulleys, one side of said pulley forming a friction surface, bearing blocks carried by the support for movement towards and from the friction surfaces, a shaft mounted for rotation in each bearing block, the axis of the shafts being substantially parallel with the adjacent friction surface, a friction pinion carried by each shaft, a belt pulley also carried by each shaft, a belt connecting each pulley with a reel, a toggle device associated with each bearing block, means comprising two friction clutch means for transmitting motion from each plate to the corresponding bearing block, means for moving one of the clutch members whenever the carrier plate is moved along the track and means comprising the other clutch member for operating the toggle device for moving the bearing blocks.

8. A friction drive and speed control mechanism, comprising, in combination, a support, a motor carried thereby, a disk having a friction surface, movably carried by the support, means for rotating the disk by power derived from the motor, a reel or the like rotatably carried by the support, a bearing member carried by the support for movement towards and away from the friction surface of the disk, a shaft carried by the bearing member for rotation about an axis substantially parallel with the friction surface, a friction pinion carried by the shaft, means for transmitting movement from the shaft to the reel, a pedal pivotally attached to the support, means operated by the pedal for moving the friction disk in a direction parallel with the shaft, means for moving the bearing member towards the friction surface of the disk whenever the center of the disk moves away from the plane of rotation of the pinion, said means comprising a two-part friction clutch and a toggle means, a friction device normally operatively connected with the shaft to resist rotation thereof, and means operated by movement of the center of the friction disk from normal inoperative position for moving the friction device into inoperative position.

9. In a reel operating and speed control mechanism, in combination, a support, a reel or the like carried thereby for rotation at different speeds, a guide bar attached to the support, a carrier plate mounted for movement along the guide bar, said carrier plate having a pivot, a friction surfaced disk rotatably mounted on the pivot, a pedal pivoted at one end to the support, means operated by movement of the pedal about its pivot for moving the carrier plate along the guide bar, a bearing member mounted on the support for movement towards and away from the friction surface, a shaft journaled in the bearing member for rotation about an axis parallel with the friction surface, a friction pinion carried by the shaft for engagement with the friction surface, means for transmitting motion from the shaft to the reel, means comprising a toggle device for moving the bearing member, means comprising a friction clutch for transmitting movement from the carrier plate to the toggle device, a friction mechanism operatively associated with the shaft, means comprising a spring for urging the friction mechanism into operative position, and means responsive to the movement of the carrier plate for moving the friction device to inoperative position whenever the carrier plate is moved to increase the distance between the center of the friction disk and the plane of rotation of the friction pulley.

10. A variable speed friction drive comprising, in combination, a support, a motor carried thereby, a guide bar carried by the support, a carrier plate movable along the guide bar, means for moving the carrier plate along the guide bar, a friction disk having a friction surface attached to the carrier plate for rotation about a pivot, means comprising the motor for rotating the friction disk, a bearing member attached to the support for movement towards and away from the friction surface, a shaft journalled in the bearing member for rotation about an axis parallel to the friction surface, a friction pinion carried by the shaft, means comprising a toggle device for moving the bearing member, and means comprising a friction clutch, having one part connected with the carrier plate and another part connected with the toggle device for transmitting motion between the two for moving the friction pinion into engagement with the friction surface whenever the carrier plate is moved in a direction to increase the distance between the center of the friction surface and the plane of the friction pinion and to release such connection when the carrier plate moves in the opposite direction.

11. A friction drive mechanism comprising in combination, a support, a guide bar carried thereby, a carrier plate supported by the bar, a pivot pin carried by the carrier plate, a disk rotatably supported on the pivot pin, said disk having a friction surface, means for moving the carrier plate along the guide bar, a bearing member carried by the support for movement towards and away from the friction surface, a shaft journalled in the bearing member, a friction pinion carried by the shaft, force transmitting means for moving the bearing member towards the friction surface, a friction clutch, means for moving one element of the clutch in response to movement of the carrier plate, another element of the friction clutch being operatively connected with the force transmitting means, the friction clutch providing a lost motion connection between the plate and the last mentioned means whereby the plate may continue its movement after the force transmitting means has stopped its movement.

12. A device in accordance with claim 11 in which there is a movement retarding device in operative engagement with the shaft, and means responsive to the movement of the carrier plate from normally inoperative position for moving the retarding device to inoperative position.

13. In a film rewind mechanism, comprising a support having two spaced reels rotatably mounted thereon, substantially identical means for rotating each reel independently of the other, comprising in combination, a motor driven disk having a friction surface, a bearing member carried by the support for movement towards and away from the friction surface, a shaft journalled in the bearing member for rotation about an axis substantially parallel with the friction surface, a friction pinion carried by the shaft, two pedals pivotally connected with the support, means interconnecting the pedals for simultaneous movement in opposite directions, each pedal controlling one reel rotating means, means responsive to the movement of the pedals in one direction for moving the bearing member towards the friction surface to bring the friction pinion into engagement with the friction surface, a friction device carried by the support, means for urging the friction device into operative engagement with the shaft, and means operated by the movement of either one of the bearing members towards the friction surface of the disk for removing the friction device from the shaft associated with the other bearing member.

JACOB M. GOLDBERG.